US011136248B2

(12) United States Patent
Pettersson et al.

(10) Patent No.: US 11,136,248 B2
(45) Date of Patent: Oct. 5, 2021

(54) PURIFICATION DEVICE

(71) Applicant: NORDAQ WATER FILTER SYSTEMS AB, Stockholm (SE)

(72) Inventors: Lasse Pettersson, Täby (SE); Stefan Witz, Täby (SE)

(73) Assignee: NORDAQ WATER FILTER SYSTEMS AB, Stockholm (SE)

( * ) Notice: Subject to any disclaimer, the term of this patent is extended or adjusted under 35 U.S.C. 154(b) by 27 days.

(21) Appl. No.: 16/478,075

(22) PCT Filed: Dec. 20, 2017

(86) PCT No.: PCT/EP2017/083948
§ 371 (c)(1),
(2) Date: Jul. 15, 2019

(87) PCT Pub. No.: WO2018/115198
PCT Pub. Date: Jun. 28, 2018

(65) Prior Publication Data
US 2019/0389749 A1  Dec. 26, 2019

(30) Foreign Application Priority Data

Dec. 20, 2016 (EP) ..................................... 16205278

(51) Int. Cl.
*C02F 1/461* (2006.01)
*C02F 1/48* (2006.01)
(Continued)

(52) U.S. Cl.
CPC ................ *C02F 1/48* (2013.01); *C02F 1/003* (2013.01); *C02F 1/283* (2013.01); *C02F 1/288* (2013.01);
(Continued)

(58) Field of Classification Search
None
See application file for complete search history.

(56) References Cited

U.S. PATENT DOCUMENTS 4,881,597 A * 11/1989 Hensley .................. E21B 33/03
166/92.1
5,064,534 A * 11/1991 Busch ....................... C02F 1/42
210/266
(Continued)

FOREIGN PATENT DOCUMENTS

CN          1997600 A       7/2007
JP        H08 294683 A      11/1996
(Continued)

*Primary Examiner* — Matthew O Savage
(74) *Attorney, Agent, or Firm* — Foley & Lardner LLP

(57) ABSTRACT

A purification device for purifying a liquid comprising a container (1) having an inlet (8) for the liquid and an outlet (9) for the liquid and a filter (10) arranged in the container (1), said filter (10) comprising activated carbon and precious metal particle and/or semi-precious metal particles and/or valve metal particles distributed in the activated carbon. The filter (10) is placed in a flow path of the liquid, the flow path of the liquid being chosen so that the liquid enters the container (1) via the inlet (8), enters the filter (10) via a lateral surface (15) and flows radially inwards towards an inside of the filter (10) and then out via 9' the outlet (9). The liquid is exposed to a galvanic voltage at least on a part of the flow path and the container (1) comprises metal at least on an inner side so that the metal is in contact with the liquid when the purification device is in use, wherein the galvanic voltage is generated by the metal and the precious metal particles and/or the semi-precious metal particles and/or the valve metal particles in the filter (10).

19 Claims, 3 Drawing Sheets

(51) Int. Cl.
*C02F 1/00* (2006.01)
*C02F 1/28* (2006.01)
*C02F 1/42* (2006.01)

(52) U.S. Cl.
CPC ............ *C02F 1/42* (2013.01); *C02F 1/46176* (2013.01); *C02F 2201/006* (2013.01); *C02F 2303/04* (2013.01)

(56) References Cited

U.S. PATENT DOCUMENTS

2005/0121387 A1* 6/2005 Kuennen ................. C02F 1/283
 210/503
2007/0251887 A1* 11/2007 Koos ................... C02F 1/46176
 210/663

FOREIGN PATENT DOCUMENTS

| JP | 2005 334750 A | 12/2005 |
| JP | 2006 212578 A | 8/2006 |

* cited by examiner

PURIFICATION DEVICE

TECHNICAL FIELD

The present invention relates to a purification device for the purification of a liquid such as water, for example water to drinking water, which purification device comprises at least one container for receiving a filter, said container having at least one inlet and at least one outlet for the liquid and said filter being located in a flow path of the liquid.

BACKGROUND OF THE INVENTION

U.S. A, 5,082,568 shows a method of removing low concentrations of metal impurities from water. An expedient device is also evident from the publication. A cylindrical core of activated carbon is arranged in a cylindrical container. The water flows radially through the core and into a longitudinal channel in the centre of the core, from where it is led further out. The activated carbon surrounds an antibacterial ion-exchange resin. The efficiency in purification however is not optimal and the flow rate of the water is relatively low.

The document DE 43 08 390 A1 discloses an insert suitable for use in a purification device comprising one filter located in the flow path of the water and a galvanic couple located in the flow path of the water. The filter is located in the flow path after the galvanic couple. The filter is composed of a compact piece manufactured from powdered activated carbon. The water can flow via the inlet in the insert and further through and out of them insert. The water flows radially from the outside and inwardly into, trough and outside the filter. The galvanic couple is made of two metal pieces, located at a distance from each other. The flow through this insert is suboptimal: all the liquid has to flow between the plates of the galvanic couple.

The document EP 1,773,722 B1 discloses a purification device comprising a stainless steel container, a filter of activated carbon comprising silver and two nets, whereby one of the nets is made of zinc or magnesium and the other of copper. The container and the filter have a cylindrical shape and an inlet and an outlet of the liquid is chosen so that the liquid is flowing through the lateral surface of the cylindrical filter radially inwards towards a centre channel of the filter. The liquid is thereby filtered and exposed to a galvanic voltage generated by the two nets arranged in the filter. An alternative solution illustrated in EP 1,773,722 B1 is that only one net is arranged in the filter, for example made of material that is not consumed in order to form the anode while the cathode may be formed by the container itself in that it is made of stainless steel and thus consumed so that the galvanic voltage is formed between the container and the net. Any solution of this document however comprises the use of a metallic net embedded in the filter.

SUMMARY OF THE INVENTION

In view of the above an object of the present invention is to provide a purification device that is efficient, easy to manufacture and reduced in complexity.

A further object of the invention is to provide a purification device that is economic and safe for producing drinking water.

The inventors of the present invention have realized after extensive testing and trials with various pollutants in the liquid and water respectively, that it is possible to avoid using a net at all in the filter of activated carbon but only use a precious metal, a semi-precious metal or a valve metal in particle form distributed in the filter as anode and using the container or at least part of the container that is in contact with the liquid to form the cathode, so that a galvanic voltage is generated between the container and the particles of precious metal and/or semi-precious metal and/or valve metal. The effect of the galvanic voltage is that bacteria and other organic pollutants in the liquid, which is preferably water that needs to be transformed into drinking water by the purification device, is killed.

Disclosed herein is a purification device for purifying a liquid comprising a container having an inlet for the liquid and an outlet for the liquid and a filter arranged in the container. The filter may be made of activated carbon and precious metal particles and/or a semi-precious metal particles and/or valve metal particles distributed in the activated carbon. The filter may be placed in a flow path of the liquid, the flow path of the liquid may be chosen so that the liquid enters the container via the inlet, enters the filter, at least partially passes through the filter and then flows out of the purification device via the outlet, whereby the liquid is exposed to a galvanic voltage at least on a part of the flow path. The container may comprise metal at least on an inner side so that the metal is in contact with the liquid when the purification device is in use. The galvanic voltage is generated by the metal of the container and the precious metal particles and/or the semi-precious metal particles and/or the valve metal particles in the filter.

A purification device according to the above does not comprise metal nets in the filter. This simplifies the production, recycling and maintenance of the purification device. The galvanic voltage is provided between the metal on the inner side of the container and the precious metal particles and/or the semi-precious metal particles and/or the valve metal particles in the filter. The galvanic voltage kills bacteria, viruses and other organic pollutants that may cause harm to a species. Such bacteria viruses or other organic pollutants may otherwise pass the filter without consequence and thereby pollute the liquid and lead to health problems and harm.

The valve metal may be one of titanium, zirconium, niobium, tantalum, tin, aluminium, vanadium or alloys thereof.

The liquid is preferably water.

The water may enter the purification device as polluted or dirty water and then exit the purification device as drinking water.

The flow path of the liquid may in the above embodiment be axial or radial.

In between the filter and the metal at least on the inner side of the container, no additional layer or material besides the liquid to be filtered, may be present. The filter made of activated carbon may thus not comprise any fiber-layer or non-woven fabric arranged on an outer side of the filter. The liquid to be filtered flows from the inlet into the container comprising the metal at least on the inner side and then directly into the filter comprising the activated carbon.

In an embodiment the flow path of the liquid may be chosen so that the liquid enters the filter via a lateral surface and flows radially inwards towards an inside of the filter and then out of the purification device via the outlet.

A radial flow path as described above may increase the capacity of the filter.

The galvanic voltage may be in a range of 0.01 V to 3 V, preferably 0.07 V to 1.5 V and more preferably 0.08 V to 1.1 V.

The galvanic voltage is generated without the additional use of an external power supply. The polarization is generated solely by the choice of metal and/or metal alloy in the filter and the metal or metal alloy of the container.

The amount of precious metal particles and/or semiprecious metal particles and/or valve metal particles in the filter is in a range of 0.01% to 5%, preferably 0.02% to 3% and more preferably 0.02% to 2%.

The percentage may preferably be measured by weight.

In an embodiment the filter may comprise 0.3% silver.

Such an amount of precious metal, semi-precious metal or valve metal may provide an efficient handling of bacteria, viruses and other organic pollutants, it may in particular help to effectively mortify such pollutants. The given range of concentration of precious metal, semi-precious metal or valve metal may further limit the amount of ion pollution caused by the precious metal-, the semi-precious metal- or valve-metal particles.

In an embodiment the metal on the inner side of the container may be a separate piece of metal arranged between the container and the filter.

The separate piece of metal may for example be a tube segment that is inserted into the container between the inner side or inner lateral side wall of the container and the filter. The tube segment may comprise a longitudinal slot for easy insertion and clamping in the container. A typical method of installing the purification device may be to open the container, insert the piece of metal such as the tube segment, insert the filter and then close the container again. The container may be made of plastic or at least comprise plastic. Alternatively the piece of metal may for example be metallic tapes or the like that can be fixed to the inner side of the container and/or the outer side of the filter.

The inner side of the container may be the inner lateral side wall of the container.

In an embodiment the metal on the inner side of the container may be a coating of metal on the inner side of the container.

The coating may be produced by a chemical coating process or a physical coating process or a combination thereof. Any other methods of coating metal onto a work piece may be used. The container may be made of plastic or at least comprise plastic.

The metal on the inner side of the container may be made of acid proof metal and the container may comprise plastic.

The acid proof metal may improve the durability of the purification device.

In one embodiment it may even be possible to include metallic fibres or particles, for instance acid-proof metallic fibres or particles, into a plastic matrix and form the container from a mixture of such a plastic matrix and such fibres or particles.

In an embodiment the container may be made of acid proof stainless steel.

The container of the purification device may thus act as a cathode via the acid-proof stainless steel while the particles of precious metal, semiprecious metal or valve metal may act as anodes. The acid proof stainless steel prohibits metal ions from entering the liquid in the container.

In an embodiment the filter may be comprise a central channel, which connects to the outlet in a sealed manner and wherein the liquid exits the filter via the central channel.

The central channel may help to guide the liquid out of the filter and to form the flow path by providing a path of least resistance out of the filter.

In an embodiment the filter and the container may have an elongated shape and the filter may be formed so that it snuggly fits into the container and wherein said elongated shape has a cross section of rectangular-, circular-, elliptic- or any combination thereof shape.

Such a shape of the filter and the container may enhance the capacity of filtration since the entering surface, thus the lateral surface of the filter is comparably large.

In an embodiment the filter may comprise a top cover and a bottom cover said top cover and bottom cover may be arranged at respective end faces of the filter, whereby the top cover comprises at least one opening that coincides with the outlet, and connects to the outlet in a sealed manner.

Advantageously the top cover and the bottom cover are formed so that they tightly seal the end faces of the filter so that the liquid flowing into the container via the inlet enters the filter via its lateral surface before it exits via the outlet.

The above ensures an efficient handling of the liquid by the purification device. As previously mentioned the liquid may be water and the outlet and the inlet may comprise connection portions for connecting the purification device to a water network.

In particular the inlet may be connected to a water supply and the outlet to a drinking water dispenser or the like.

The precious metal particles and/or the semi-precious metal particles and/or valve metal particles may be chosen from silver, gold, platinum, titanium, copper or a mixture thereof.

Using one of the above metals may prevent the liquid from being polluted by ion that could potentially be damaging to a body of a subject such as a human or animal.

Generally speaking any metal that is not damaging to a human or animal body may be used in particle or powder form in the filter as long as it can provide a galvanic voltage together with the metal of the container.

The container may comprise a cover and a cup-shaped portion, wherein the cover can be connected in a removable fashion to the cup-shaped portion via a connecting mechanism. Such a connecting mechanism may enable a user or service operator to replace the filter with a new filter comparably easy when the filter reached its life-cycle end.

In a preferred embodiment the filter may only comprises activated carbon, an adhesive and precious metal particles and/or a semi-precious metal particles and/or valve metal particles. The filter may thus not comprise any form of metal net or other metal elements than the precious metal, the semi-precious metal or valve metal in particle form.

In another embodiment the metal arranged on an inner side of the container may be a net in the shape of a tube so that the net fits into the container and surrounds the lateral surface of the filter.

The net allows to speed up the manufacturing process since the net can be placed in the container and then the filter can be placed in the net. In a preferred embodiment the container and the filter may be cylindrical in shape so that the net fits snuggly into the container and the filter again snuggly into the net.

BRIEF DESCRIPTION OF THE DRAWINGS

The present invention will now be described, for exemplary purposes, in more detail by way of an embodiment and with reference to the enclosed drawings, in which.

DETAILED DESCRIPTION

Figures 1, 2:
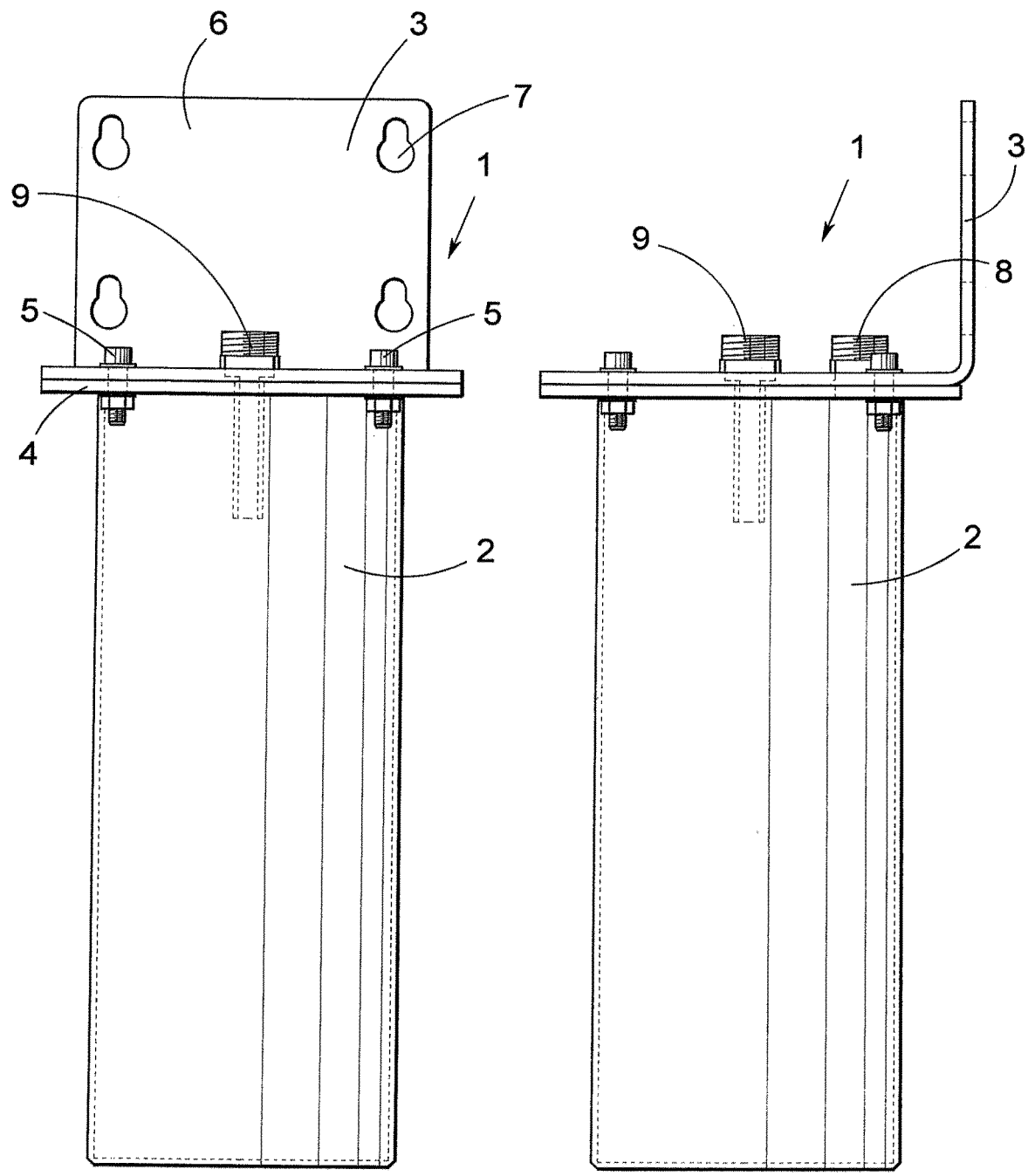
FIG. 1 schematically illustrates a front view of a purification device according to the invention.
FIG. 2 schematically illustrates a side view of the purification device according to the invention.

FIGS. 1 and 2, illustrate a purification device for purifying a liquid, preferably water, according to the invention. The purification device comprises a container 1 comprising a cup shaped portion 2 and a cover 3. The container 1 is configured to receive a filter 10 as explained later herein, referring to FIGS. 3 to 5. The cup shaped portion 2 is essentially cylindrical in shape and provided with a flange-like edge 4 around the entire upper periphery thereof and the cover 3 is fastened to the cup shaped portion 2 by means of bolts 5 in through holes in the cover 3 and said flange-like edge 4. The through holes are formed in the cover 3 and the flange like edge 4 so that the bolts 5 can extend through the cover and flange like edge 4 of the cup-shaped portion. The bolts 5, the through holes and the flange like edge 4 together form a connecting mechanism, which connecting mechanism is used to connect the cover 3 to the cup shaped portion 2. Even if the cup shaped portion 2 is shown in cylindrical shape any other shape is conceivable as long as it can receive a filter 10.

Depending on the material used for the container the connecting mechanism may be adapted. The connecting mechanism may for example be adapted depending on the material used for the container 1 and the cup shaped portion 2 and the cover 3, respectively.

The cover 3 is provided with an essentially upwardly directed flank 6 provided with four through holes 7 for the mounting of the container 1 including its content on a wall or the like. The cover 3, further comprises an inlet 8 and an outlet 9, which both are provided with connection portions illustrated in the form of threaded connections in the outer ends thereof facing the surroundings. The connection portions may be formed in another manner, such as for example as clamp and flange connections, bayonet connectors or any type of commonly known connection solutions for pipe shaped elements.

Figures 3, 4:
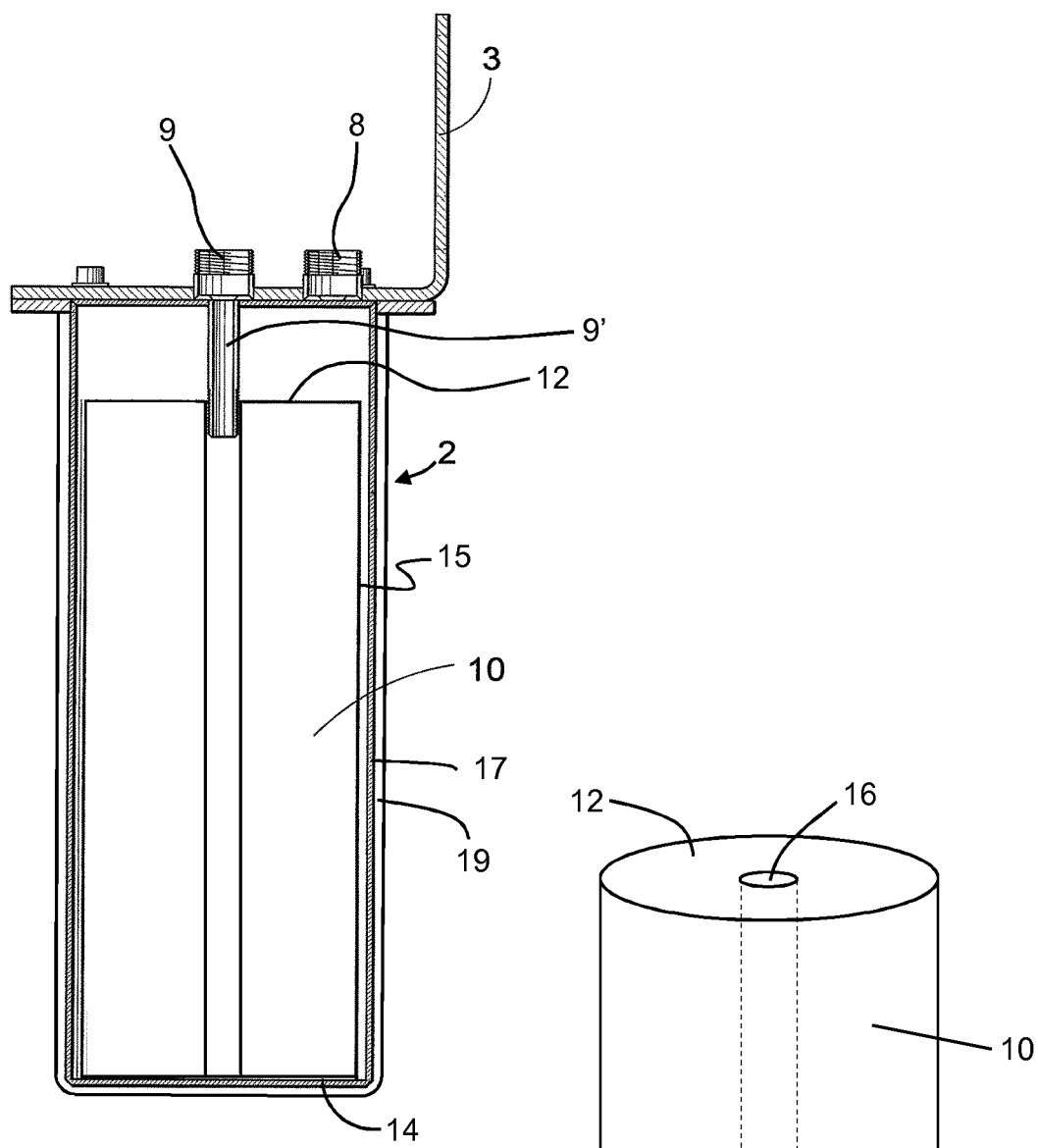
FIG. 3 schematically illustrates a cross section of the purification device according to the invention.
FIG. 4 schematically illustrates a perspective view of a filter for the use in the purification device.

The inlet 8 and outlet 9 are shown to be arranged in the cover 3;—it is however possible to arrange the inlet 8 and the outlet 9 on the cup shaped portion 2 or arranging the inlet 8 and the outlet 9, respectively, on the cover 3 and the outlet 9 and the inlet 8, respectively, on the cup shaped portion 2. The fact that the outlet 9 comprises a pipe portion 9' that is extending through the cover 3 and into the container 1 and that this pip portion 9' also is provided with a threaded connection in the inner end thereof is illustrated in FIG. 3, where the purification device is depicted in cross-section cut through the inlet 8 and the outlet 9 and the filter 10. The threaded connection in the inner end of the outlet 9 connects to a corresponding thread in a top cover 12 arranged on the filter 10. The top cover 12 is preferably fixedly connected to the upper end face of the filter 10. The filter 10 further comprises a bottom cover 14. The bottom cover 14 is also preferably fixedly connected to the filter 10, namely to the bottom end face of the filter 10. The filter 10 illustrated in FIG. 3 has an elongated shape that corresponds at least more or less to the shape of the container 1 so that the filter 10 snuggly fits into container 1 leaving a small lateral gap between the container 1 and the cup shaped portion 2, respectively, and the filter 10. The top cover 12 and the bottom cover 14 may be glued, press fitted or heat welded to the filter 10. The top cover 12 and the bottom cover 14 may be made of waterproof material such as plastic or sheet metal so that no liquid can enter the filter 10 via its end faces.

In FIG. 3 the cup shaped portion 2 is further illustrated. The cup shaped portion 2 comprises, in the illustrated embodiment, an outer portion 19. The outer portion 19 may be made of plastic. Inside the cup shaped portion 2 and between the filter 10 and the cup shaped portion 2 a piece of metal 17 may be arranged. In the illustrated embodiment the piece of metal 17 may be a tube segment with a closed bottom. The piece of metal (not shown) may however by an open tube segment, an open tube segment comprising a longitudinal slot, metal band(s) or metal tapes arranged radially or axially around the filter 10.

Alternatively the piece of metal may be embodied (not shown) as a coating of metal on the inner side, preferably the inner lateral side walls, of the cup shaped portion 2.

In still another embodiment the piece of metal may be embodied as metallic particles or fibres embedded in a plastic matrix, whereby the plastic matrix and metallic particles or fibres together form the cup shaped portion (not shown) of the container.

The metal used for the piece of metal 17 may be acid proof metal or even stainless acid-proof steel.

In an embodiment the cup shaped portion (not shown) may be made of stainless acid-proof steel.

Figure 5:
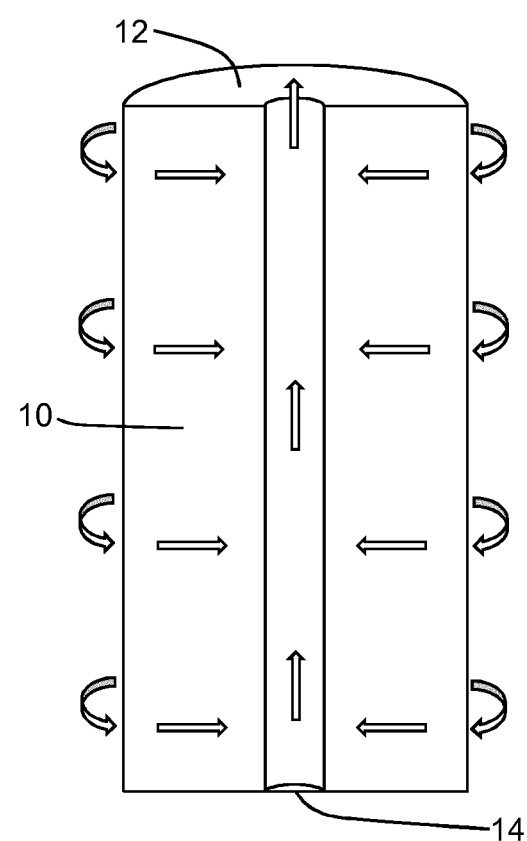
FIG. 5 schematically illustrates a cross-sectional view of the filter of FIG. 4 illustrating a flow path of a liquid in the filter.

FIG. 4 illustrates a perspective view of the filter 10. The filter 10 has an elongated shape thereby defining a longitudinal axis. Along this longitudinal axis extending through the centre of the filter 10 is a central channel 16 arranged. In FIG. 4 the central channel 16 is partially indicated by dashed lines. The central channel 16 is closed at the bottom of the filter 10 by the bottom cover 14 (c.f. FIG. 5) and open at the top of the filter 10 by an opening in the top cover 12. The opening in the top cover 12 connects directly to the pipe portion 9' of the outlet 9 so that the liquid can flow out of the filter 10 via the central channel 16 and out of the container 1 via the pipe portion 9' and the outlet 9. The opening in the top cover 12 may comprises a thread that interacts with a thread in the pipe portion 9' for a sealed connection between the filter 10 and the outlet 9. The pipe portion may alternatively have a conical shape that engages the opening in the top cover 12 for a sealed connection between the filter 10 and the outlet 9.

The filter 10 is made of compressed activated carbon in powder form, which carbon is impregnated with precious metal particles and/or a semi-precious metal particles or valve particles for an even distribution of precious metal, semi-precious metal or valve metal in the filter 10. The powdered activated carbon and the precious metal-, the semi-precious metal- or valve metal-particles may be held together by an adhesive such as a thermoplastic adhesive. The amount of precious metal, semi-precious metal or valve metal may be 0.01% to 5%, preferably 0.02% to 3% and more preferably 0.02% to 2% by weight. The precious metal-, semi-precious metal- or valve metal powder or particles may be silver, gold, platinum, vanadium, tin, aluminum, copper, titanium or a mixture/alloy thereof. In the illustrated embodiment the filter 10 has a cylindrical shape. A lateral surface 15 of the filter 10 is also indicated in FIG. 4. The lateral surface 15 is basically the surface of the filter 10 that is not covered by the top cover 12 or bottom cover 14.

The particles may be depicted as powder. In addition they may be a mixture or an alloy of precious metals, semi-precious metal or valve metal.

Since the top cover 12 and the bottom cover 14 do not allow the liquid to enter via the end faces of the filter 10, when the liquid enters the container 1 via the inlet 8, it flows into the gap formed between the lateral surface 15 of the filter 10 and the container 1, which gap is illustrated in FIG. 3, and then via the lateral surface 15 into the filter 10. This lateral entering of the filter 10 is ensured since the liquid or water cannot not enter the filter via its end faces since they are covered by the bottom cover 14 and top cover 12. From the lateral surface 15 the liquid flows radially inwards towards the inside of the filter 10 and towards the central channel 16 and then out of the filter 10 via the central channel 16 and out of the container 1 via the pipe portion 9' and outlet 9. The flow path is best illustrated in FIG. 5 by arrows. Such a radial flow path provides for a high capacity of filtration.

While the liquid is flowing through the container 1 and through the filter 10 it is exposed to a galvanic voltage which is present between the metal of the container 1, which may be acid-proof stainless steel, and the precious metal- and/or semi-precious metal- and/or valve metal-particles or powder in the filter 10. This galvanic voltage has the ability to kill bacteria and other organic pollutants in the liquid, while the liquid remains in the container 1 and the filter 10 respectively. In addition, if for example an anti-bacterial metal such as silver is used in the filter 10, the combined bactericidal effect of the galvanic voltage and the silver may be further improved.

The galvanic voltage generated by the metal of the container 1 and the particles of precious metal, semi-precious metal or valve metal in the filter 10 may be in a range of 0.01 V to 3 V, preferably 0.07 V to 1.5 V and more preferably 0.08 V to 1.1 V.

In a particular embodiment the filter 10 does not comprise any metal net or other metallic elements besides the particles or powder of precious metal, semi-precious metal or valve metal.

As previously described the container 1 and the filter 10 have a generally elongated and cylindrical shape. Any other suitable shape may however be used. Advantageously the surface via which the liquid enters the filter 10 is comparably large in order to enhance the capacity of the filter and the entire system.

Even though the embodiment illustrated in the figures comprises a central channel 16 in the filter 10 it is possible to use a filter (not shown) without a central channel. In such an embodiment the top cover 12 may still comprise an opening that connects to the outlet 9 so that the liquid is flowing out of the filter via said opening and outlet 9.

In another embodiment (not shown) the central channel 16 may be coated or at least partially filled with an ion exchange resin, for example held in place by a net. The ion exchange resin may be used to catch the small amount or small particles of heavy metals that can potentially pass through filter 10.

The filter (not shown) may comprise at least one first pre-filter present in said flow path. The pre-filter may for example be arranged on the lateral surface of the filter and it may be of cellulose material having a porosity that allows particles having a size of approx. 5.0-15.0 µm (micron), preferably approx. 5.0 µm, to pass through.

The filter 10 may have a porosity that allows particles having a size of approx. 0.2-0.4 µm, preferably approx. 0.3 µm, to pass through. As previously mentioned the filter 10 may be made of activated carbon, the precious-metal-, semi-precious metal- or valve metal-particles and an adhesive. The adhesive may hold the filter 10 together as a solid piece of material.

In a further embodiment (not shown) the metal arranged on the inner side may be embodied as a net in the form of a tube section forming an opening or cavity thereby. The filter may thereby fit into the opening and thus the cavity formed by the tube section so that the nets surrounds a lateral surface of the filter when the filter is placed in the net. The container and the filter may be cylindrical.

The invention claimed is:

1. A purification device for purifying a liquid comprising:
   a container having:
      an inlet for the liquid;
      an outlet for the liquid; and
      a filter arranged in the container, said filter comprising activated carbon and at least one of precious metal particles, semi-precious metal particles, or valve metal particles distributed in the activated carbon, the filter being placed in a flow path of the liquid, the flow path of the liquid configured so that the liquid enters the container via the inlet, enters the filter, at least partially passes through the filter and then flows out of the purification device via the outlet,
   wherein the liquid is exposed to a galvanic voltage at least on a part of the flow path;
   wherein the container comprises metal at least on an inner side so that the metal is in contact with the liquid when the purification device is in use;
   wherein the galvanic voltage is generated by the metal at least on the inner side of the container and the at least one of the precious metal particles, the semi-precious metal particles, or the valve metal particles in the filter;
   wherein the flow path of the liquid is chosen so that the liquid enters the filter via a lateral surface and flows radially inwards towards an inside of the filter and then out of the purification device via the outlet; and
   wherein the amount of precious metal particles and/or semiprecious metal particles and/or valve metal particles in the filter is in a range of 0.01% to 5% of the filter by weight.

2. The purification device according to claim 1, wherein the galvanic voltage is in a range of 0.01 V to 3 V.

3. The purification device according to claim 1, wherein the amount of the at least one of the precious metal particles, the semiprecious metal particles, or the valve metal particles in the filter is in a range of 0.02% to 3% of the filter by weight.

4. The purification device according to claim 1, wherein the metal at least on the inner side of the container is a separate piece of metal arranged between the container and the filter.

5. The purification device according to claim 1, wherein the metal at least on the inner side of the container is a coating on the inner side of the container.

6. The purification device according to claim 1, wherein the metal at least on the inner side of the container is acid proof metal and wherein the container comprises plastic.

7. The purification device according to claim 1, wherein the container is made of acid proof stainless steel.

8. The purification device according to claim 1, wherein the filter comprises a central channel, which connects to the outlet in a sealed manner and wherein the liquid exits the filter via the central channel.

9. The purification device according to claim 1, wherein the filter and the container have an elongated shape and wherein the filter is formed so that the filter snuggly fits into the container and wherein said elongated shape has a cross section of rectangular-, circular-, elliptic- or any combination thereof-shape.

10. The purification device according to claim 1, wherein the filter comprises a top cover and a bottom cover, said top cover and bottom cover being arranged at respective end faces of the filter, wherein the top cover comprises at least one opening that coincides with the outlet and connects to the outlet (9) in a sealed manner.

11. The purification device according to claim 10, wherein the top cover and the bottom cover are configured to tightly seal the end faces of the filter so that the liquid flowing into the container via the inlet enters the filter via the lateral surface before it exits via the outlet.

12. The purification device according to claim 1, wherein the liquid is water and wherein the outlet and the inlet comprise connection portions for connecting the purification device to a water network.

13. The purification device according to claim 1, wherein the at least one of the precious metal particles, the semi-precious metal particles, or the valve metal is at least one of silver, gold, platinum, copper, tin, aluminium, vanadium, titanium or a mixture or alloy thereof.

14. The purification device according to claim 1, wherein the container comprises a cover and a cup-shaped portion, the cover configured to be connected in a removable fashion to the cup-shaped portion via a connecting mechanism.

15. The purification device according to claim 1, wherein the filter consists of activated carbon, an adhesive, and the at least one of the precious metal particles, the semi-precious metal particles, or the valve metal particles.

16. The purification device according to claim 1, wherein the galvanic voltage is in a range of 0.07 V to 1.5 V.

17. The purification device according to claim 1, wherein the galvanic voltage is in a range of 0.08 V to 1.1 V.

18. The purification device according to claim 1, wherein the amount of the at least one of the precious metal particles, the semiprecious metal particles, or the valve metal particles in the filter is in a range of 0.02% to 2% of the filter by weight.

19. The purification device according to claim 1, wherein:
the amount of the at least one of the precious metal particles, the semiprecious metal particles, or the valve metal particles in the filter is in a range of 0.02% to 3% of the filter by weight; and
the galvanic voltage is in a range of 0.01 V to 3 V.

* * * * *